Figure 1:
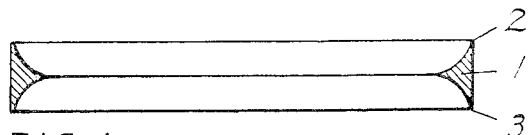

July 11, 1950  J. STIVÍN  2,514,976
SEALING OF VESSELS OF ELECTRONIC DISCHARGE DEVICES
Filed Feb. 25, 1947  2 Sheets-Sheet 1

INVENTOR
Jiří Stivín
BY
ATTORNEY

July 11, 1950   J. STIVIN   2,514,976
SEALING OF VESSELS OF ELECTRONIC DISCHARGE DEVICES
Filed Feb. 25, 1947   2 Sheets-Sheet 2

INVENTOR
Jiri Stivin
BY
ATTORNEY

Patented July 11, 1950

2,514,976

UNITED STATES PATENT OFFICE 2,514,976

SEALING OF VESSELS OF ELECTRONIC DISCHARGE DEVICES

Jiří Stivín, Rychnov u Jablonce nad Nisou, Czechoslovakia

Application February 25, 1947, Serial No. 730,827
In Czechoslovakia February 26, 1946

6 Claims. (Cl. 285—139)

The present invention relates to sealing of vessels of electronic discharge devices such as thermionic valves or the like.

For sealing of metal vessels of discharge devices various methods such as soldering or the like have been suggested. Such methods are relatively unsatisfactory and do not yield the required results.

The main object of the invention is to provide an extremely efficient, cheap and satisfactory process for sealing of vessels of discharge devices.

A further object of the invention is to provide means by which the vessels of electric discharge devices may be sealed in a suitable and cheap manner so as to adapt the vessel for easy assembly and disassembly.

Further objects and advantages of the invention will appear from the ensuing description.

According to the invention the connecting and sealing operation is distinguished by the fact that between metallic annular surfaces, which have to be sealed, a sealing ring, preferably made of steel is inserted, said ring being provided at its axially disposed borders with sharp or knife edges, preferably hardened, which upon pressing against each other of the surfaces to be sealed and thereby also against the sealing ring penetrate into the surfaces to be hardened, forming thus a perfectly tight seal.

It seems that the extremely high efficiency of the seal and its excellent sealing characteristics are due not only to the penetration of the knife edge into the softer material, usually copper, of the discharge device vessel, but also to the fact that the specific pressure on the sharp edge is so high that a diffusion of the two materials takes place, in the proximity of the edge, resulting in an absolutely tight seal. A further improvement may be obtained by subjecting the vessel of the discharge device with the knife edge pressed into the sealing surfaces to a suitable heat treatment, by which the diffusion of the two materials into each other is facilitated and may take place to a greater extent.

The invention may be used preferably also for sealing of the attachment members in the operation of evacuating vessels for discharge devices or the like and for closing such attachment members after the evacuation of the vessel has been completed, without the vacuum being interfered with even in the least degree.

According to the usual practice vessels of the kind described above are evacuated by means of a glass-tube, which after the desired vacuum has been achieved, is closed by flame or in a similar way. This method is, however, objectionable, because if the tube is closed by a flame or by high temperature, the heated glass releases gas absorbed therein; further a diffusion of gases through the hot portions is made possible, impairing thus the degree of vacuum.

According to the invention the evacuating tube may be attached to a metal portion of the vessel, in which the required aperture is provided and to which a cover or bell is applied. The bell is connected with the evacuating tube and provided at its lower part, adjacent to the wall of the vessel, with two annular knife edges, one of which is arranged within the other, the outer knife edge in initial condition extending to a somewhat greater extent than the inner edge; the annular space between the two knife edges is in connection with the evacuating tube. In operation the bell is first pressed against the wall of the vessel, so that its outer knife edge penetrates into the wall, whereupon the vessel may be evacuated, as the annular space between the two knife edges, which is in connection with the evacuating tube, is connected also by means of the passage or channel formed under the inner knife edge, with the space inside the latter and consequently also with the said aperture and the interior of the vessel to be evacuated. After evacuation the middle portion of the bell is pressed against the wall of the container, so that the inner knife edge penetrates into the wall, closing thus the aperture of the vessel and forming a perfect seal without impairing in the slightest degree the obtained vacuum. If required, the annular space between the two knife edges may be filled with tin or other suitable metal or other material, in order to improve the mechanical strength of the connection.

Figure 2:
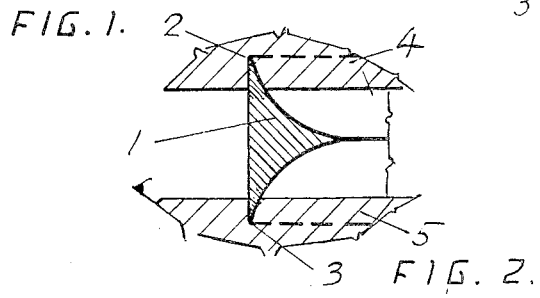
Figure 3:
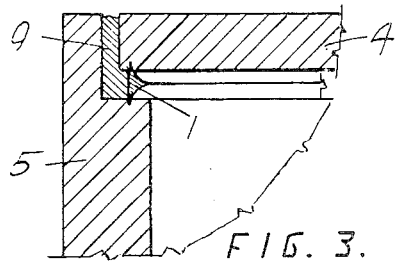
Figure 4:
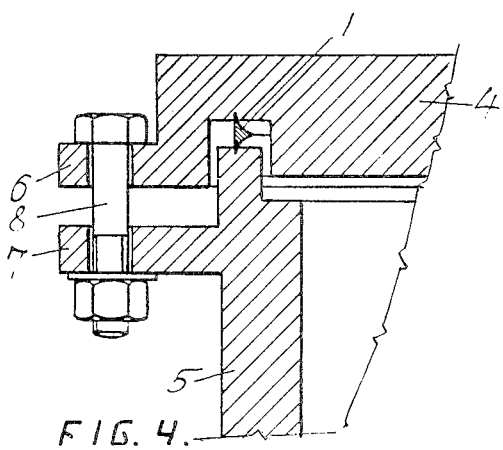
Figures 5, 6:
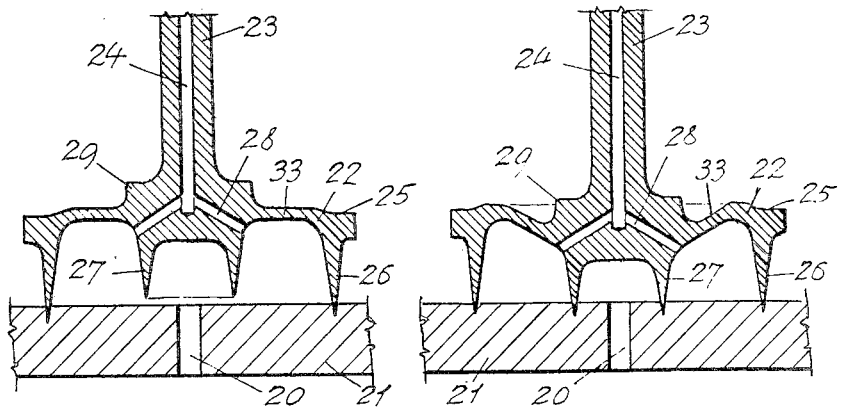
Figures 7, 8:
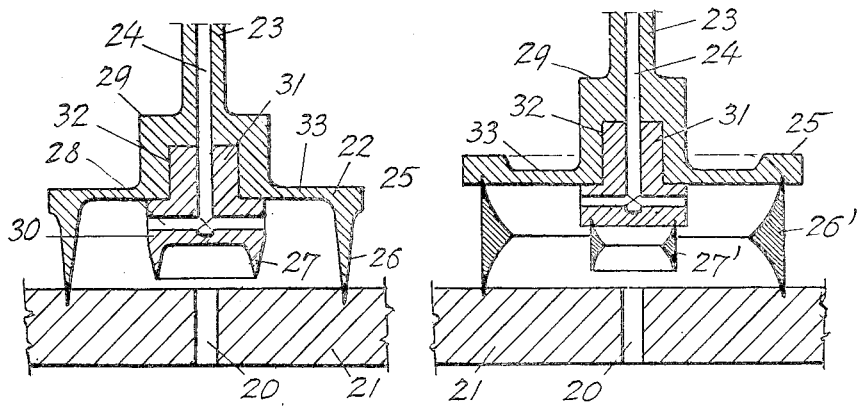

The accompanying drawings show by way of example several embodiments of the invention and the manner in which it may be preferably used. In the drawings:

Fig. 1 shows in a cross-sectional view, a sealing ring carried out according to the invention, Fig. 2 represents on a larger scale a partial cross-section of a sealing ring inserted between the surfaces to be sealed, Fig. 3 shows in partial cross section the sealing of a cover on a metal vacuum vessel of a discharge device, Fig. 4 shows a modified arrangement of the seal, Figs. 5, 6, 7 and 8 represent more or less diagrammatically means for sealing an evacuating tube in the operation of evacuating a discharge device vessel or the like and for closing such vessel or the like container after its evacuation, wherein Fig. 5 shows in partial longitudinal section the means in the first stage of operation, Fig. 6 shows in a view similar to Fig. 5 the said means after the vessel has been closed, Fig. 7 shows in a similar view a modified arrangement and Fig. 8 shows a further modification.

The sealing ring 1 as shown in Figs. 1 and 2, consisting for instance of steel, is substantially of triangular cross-section. Its surfaces, preferably its inner inclined surfaces, are ground to a concave shape, which may easily be done by means of suitable wheel-grinders. In this way annular knife edges 2 and 3 are formed on its upper and lower parts, said edges being hardened, preferably by heating the edges by means of induced high frequency eddy currents with the employment of a suitable hardening head. If the ring, formed as described above, is inserted between two surfaces, such as between flanges 4 and 5 of an electronic discharge device made of a material, which is softer than that of the ring, e. g. of copper, and if the flanges are pressed against each other, then even if a relatively small pressure is applied in pressing the surfaces towards each other, the specific pressure on the knife edges 2 and 3, owing to their extremely small area, is so great, that the knife edges penetrate into the softer material of the flanges, as shown in Fig. 2. A perfectly tight seal is thus obtained between the two flanges 4 and 5 by such extraordinarily simple means. As only the knife edges of the ring 1 are hardened, the remaining mass of the latter retains its toughness or ductility, so that when the surfaces to be sealed are pressed against each other breakage of the ring need not be feared, which otherwise might happen, when the entire mass of the sealing ring would be hardened through.

Fig. 3 shows the use of the seal according to the invention in connection with a vacuum vessel 5, closed by a cover 4. In the example shown the vessel is part of a metal electronic discharge device, the cover of which has to be perfectly sealed, as the vacuum of the discharge device must not be impaired even after a long time. The sealing ring 1 in this case is interposed between a shoulder on the cylindrical wall 5 of the vessel and cover 4; by pressing the latter against the vessel the knife-edges of the ring 1 are pressed into the copper walls of the vessel and cover, resulting in a perfectly tight seal. To release the sealing ring from mechanical strain, the annular groove between the surface of the wall 5 and the surface of the cover 4 may be filled with any suitable material, such as tin or the like, poured into the groove 9.

Another embodiment of the seal according to the invention is shown in Fig. 4, wherein the sealing ring 1 is interposed into a separate groove arranged in the bottom of the cover 4, into which partially protrudes the upper extension of the wall 5 of the vessel to be sealed. Mechanical strains are removed from the sealing ring 1 by means of a flange connection 6, 7. The flanges are connected together by means of screws 8, which provide also the pressure necessary for pressing the knife edges of the sealing ring 1 into the surfaces to be sealed. Owing to the sharpness of the knife edges the pressure provided by tightening the screws is entirely sufficient for this purpose.

Figs. 5 and 6 show the application of the invention in sealing the attachment of an evacuating tube to a vessel, e. g. of an electronic discharge device, to be evacuated, so as to achieve a perfectly sealed closure after the required vacuum is reached in such a way that in closing the vessel the vacuum is in no way impaired, or destroyed.

In Figs. 5 and 6 the reference numeral 21 denotes a metal e. g. copper wall of the vessel to be evacuated, said wall being provided with an aperture 20, which has to be brought into connection with the evacuating tube 23. The tube is for this purpose provided at its lower end with a bell 22, which may be placed over the aperture 20 and is provided with two circular knife edges 26, 27 arranged one inside the other, of which the outer edge 26 projects to a certain extent over the inner edge 27. The annular space between the two knife edges is connected by means of bores 28 with a bore 23 of the evacuating tube, whereas the space enclosed by the inner knife edge 27 is closed against the said bore. After the bell has been applied over the aperture 20 it is pressed into the metal of the wall 21 of the vessel to be evacuated by suitable pressure, generated by any desired pressure means (not shown) acting for instance upon a flange 25 of the bell 22, provided for this purpose, so that the outer knife edge 26 which, of course, is hard or hardened, penetrates into the metal of the wall 21 sealing thus perfectly the connection between the bell 22 and the said wall 21.

The bore 23 of the evacuating tube 24 is now connected by said bores 28 with the annular space between the said two knife edges and through the passage or channel under the inner edge 27 also with the space above the aperture 20, leading inside the vessel to be evacuated, so that the vessel may now be evacuated, the connection of the evacuating tube with the vessel being sealed by the knife edge 26. When the desired vacuum has been achieved, the middle portion of the bell 22 is depressed for instance by pressure produced in the direction towards the vessel by suitable pressing means acting against the shoulder 29 of the bell. The inner knife edge 27, is thus pressed into the wall 21 of the vessel under simultaneous deformation of the thin ceiling 33 of the bell above the annular space between the knife edges 26 and 27, as shown in Fig. 6.

The aperture 20 in the vessel is thus separated in a gas-tight manner from the bore of the tube 23 and also from the surrounding atmosphere when the tube 23 is severed, without the obtained vacuum being impaired. The tube 23 may be separated from the vacuum-pump e. g. by cutting away or in any other suitable way. The bell 22 may moreover be mechanically secured e. g. by pouring tin, solder or any other suitable metal or other material 34 into the space between the two knife edges.

The arrangement according to Fig. 7 corresponds substantially to the embodiment according to Fig. 5 with the exception that the inner edge 27 is provided on a separate piece 31, inserted into a corresponding recess 32 in the bell 22. In this case the outer bell 22 may be removed after the inner edge 27 has been pressed into the wall of the vessel and the piece 31 secured with tin, poured around, if desired, so that the aperture 20 of the vessel remains closed by the inner piece 31, the edge 27 of which has been pressed into the wall of the vessel.

In all instances of application of the invention the seal obtained may be subject to additional heat treatment by which the diffusion of the two metals in the neighbourhood of the knife edge may be increased.

The bell as shown in Figs. 5 to 7, may of course be modified in various ways. So for instance, the outer, and if required also the inner knife edge may be replaced by rings 26' and 27' similar to those shown in Figs. 1 and 2 as shown diagrammatically in Fig. 9.

The invention is in no way limited to the examples described and shown in the drawings, and is capable of various modifications. In particular it is possible to combine various embodiments as required for each particular case.

While I have disclosed the principles of my invention in connection with particular embodiments it will be understood that these embodiments are given by way of example only and not as limiting the scope of the invention as set forth in the appended claims.

I claim:

1. An adapter for connecting an evacuating device such as a vacuum pump with an article to be evacuated, such as an electronic discharge device, comprising a connecting member having an internal bore; an outer and an inner endless member, disposed relatively in concentric and spaced relationship, the said endless members being adapted to be placed between said connecting member and a face of the electronic discharge device and opposite an evacuating channel provided in said latter device, the said endless members being made of a material harder than the material of the said face of the electronic discharge device; a pair of knife edges disposed oppositely on each of said endless members and adapted to be pressure-forced into said connecting member and said face of the electronic device; and duct means for providing a communication between the space intermediate said endless members and the said internal bore.

2. An adapter for an evacuating device like a vacuum pump comprising a bell-shaped member adapted to be placed over the face and evacuating outlet of an electronic discharge device or the like; an annular knife edge formed at the bottom of the circumferential wall of said bell-shaped member and made of a material harder than the said face of the electronic discharge device; and duct means for providing an exterior communication for the interior of said bell-shaped member so as to permit connection to a vacuum pump.

3. An adapter for an evacuating device like a vacuum pump comprising a bell-shaped member adapted to be placed over the face and evacuating outlet of an electronic discharge device or the like; an outer annular knife edge formed at the bottom of the circumferential wall of said bell-shaped member; wall means forming part of said bell-shaped member and extending in concentrical and spaced relationship inside said circumferential wall; an inner knife edge formed at the bottom end of said wall means, the said two knife edges being made of a material harder than the said face of the electronic discharge device and the said knife edges defining as between them an intermediate annular space and the outer of said knife edges having a length in excess of the length of the inner knife edge; and duct means for providing an exterior communication for said intermediate space permitting connection to a vacuum pump, whereby the said intermediate space may be sealed during evacuation against the outside by said outer edge and whereby after the completion of evacuation the evacuating outlet may be sealed by said inner edge against said duct means after further driving said bell-shaped member towards the face of the electronic discharge device.

4. An adapter for an evacuating device like a vacuum pump constructed in accordance with claim 3 wherein the portion of said bell-shaped member which forms the top wall of said intermediate space consists of a relatively pliable material so that such portion may be indented and the said inner knife edge may thereby be forced into the face of the electronic discharge device after completion of the evacuation.

5. An adapter for an evacuating device like a vacuum pump comprising a bell-shaped member adapted to be placed over the face and evacuating outlet of an electronic discharge device or the like; an outer annular knife edge formed at the bottom of the circumferential wall of said bell-shaped member; an annular partition member disposed inwardly and in concentrical spaced relationship to the said circumferential wall so as to define an intermediate space; an inner knife edge formed at the bottom end of said partition member, the said two knife edges being made of a material harder than the face of the electronic discharge device and the outer of said knife edges having a length in excess of the length of the inner knife edge; and duct means for providing an exterior communication for said intermediate space permitting connection to a vacuum pump, whereby the said intermediate space may be sealed during evacuation against the outside by said outer edge and whereby after the completion of evacuation the evacuating outlet may be sealed by said inner edge against said duct means after further driving said bell-shaped member towards the face of the electronic discharge device.

6. A seal adapted for the relative sealing of smooth surfaces of electronic discharge devices or the like comprising an endless member of a substantially triangular cross section, having one long and two short sides, the long side forming a cylindrical wall and the two short sides of the triangle having a concave profile so as to provide oppositely disposed knife edges and the said endless member being made of a material harder than the material of said surfaces whereby said knife edges may be pressure-forced into the material of said surfaces.

JIŘÍ STIVÍN.

REFERENCES CITED

The following references are of record in the file of this patent:

UNITED STATES PATENTS

| Number | Name | Date |
| --- | --- | --- |
| 1,834,581 | Ferrell et al. | Dec. 1, 1931 |
| 2,014,612 | Borton | Sept. 17, 1935 |
| 2,087,179 | Barker | July 13, 1937 |